(12) United States Patent
Zhang et al.

(10) Patent No.: US 11,112,516 B2
(45) Date of Patent: Sep. 7, 2021

(54) DATA FUSION TECHNIQUE TO COMPUTE RESERVOIR QUALITY AND COMPLETION QUALITY BY COMBINING VARIOUS LOG MEASUREMENTS

(71) Applicant: SCHLUMBERGER TECHNOLOGY CORPORATION, Sugar Land, TX (US)

(72) Inventors: Tuanfeng Zhang, Lexington, MA (US); Richard E. Lewis, Longmont, CO (US); Helena Gamero Diaz, Frisco, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 498 days.

(21) Appl. No.: 15/966,607

(22) Filed: Apr. 30, 2018

(65) Prior Publication Data

US 2019/0331813 A1    Oct. 31, 2019

(51) Int. Cl.
*G01V 1/30* (2006.01)
*G01V 1/40* (2006.01)
(Continued)

(52) U.S. Cl.
CPC .............. *G01V 1/30* (2013.01); *G01V 1/40* (2013.01); *G06F 17/153* (2013.01); *G06F 17/16* (2013.01); *G01V 2210/61* (2013.01)

(58) Field of Classification Search
CPC ........ G01V 1/30; G01V 1/40; G01V 2210/61; G01V 11/00; G01V 3/38; G01V 9/00; G01V 99/005; G01V 1/50; G06F 17/153; G06F 17/16; G06K 9/00496; G06K 9/6247; G06N 20/00; E21B 47/00; E21B 49/087
(Continued)

(56) References Cited

U.S. PATENT DOCUMENTS 4,327,412 A * 4/1982 Timmons ............. G01V 11/002
324/323
5,444,619 A * 8/1995 Hoskins .................. E21B 49/00
382/159
(Continued)

OTHER PUBLICATIONS

Cipolla, C. et al., "Appraising Unconventional Resource Plays: Separating Reservoir Quality from Completion Effectiveness", IPTC 14677, presented at the 2011 International Petroleum Technology Conference, Bankok, Thailand, 27 pages.
(Continued)

*Primary Examiner* — Jeffrey P Aiello
(74) *Attorney, Agent, or Firm* — Trevor G. Grove

(57) ABSTRACT

Methods may include normalizing two or more wellbore logs obtained from the output of two or more wellbore tool surveys of a wellbore in a formation of interest; inputting two or more wellbore logs into a correlation matrix; assigning each of the two or more wellbore logs a positive or negative value based on the impact on a selected wellbore quality; performing a principal component analysis of the two or more wellbore logs to obtain one or more loading vectors; computing weighting factors for each of the two or more wellbore logs from the one or more loading vectors; and generating a quality index by linearly combining the two or more wellbore logs using the computed weighting factors.

20 Claims, 12 Drawing Sheets

(51) Int. Cl.
*G06F 17/15* (2006.01)
*G06F 17/16* (2006.01)

(58) Field of Classification Search
USPC .................. 73/152.02; 166/250.01; 345/419; 702/6–9, 11–13, 86; 703/2, 7, 10
See application file for complete search history.

(56) References Cited

U.S. PATENT DOCUMENTS

| | | | |
|---|---|---|---|
| 2005/0228590 A1 | 10/2005 | Jeffryes | |
| 2007/0016389 A1* | 1/2007 | Ozgen | E21B 47/00 703/10 |
| 2011/0099132 A1* | 4/2011 | Fruehbauer | G01V 11/00 706/12 |
| 2011/0261648 A1 | 10/2011 | Hennenfent | |
| 2011/0272161 A1 | 11/2011 | Kumaran et al. | |
| 2013/0270011 A1* | 10/2013 | Akkurt | E21B 49/088 175/58 |
| 2014/0126328 A1* | 5/2014 | Hirabayashi | G01V 1/288 367/73 |
| 2014/0129149 A1 | 5/2014 | Gzara et al. | |
| 2015/0088424 A1* | 3/2015 | Burlakov | G01V 1/40 702/6 |
| 2015/0106018 A1* | 4/2015 | Robinson | G01V 11/00 702/11 |
| 2015/0346384 A1* | 12/2015 | Kalyanaraman | G01V 3/18 702/6 |
| 2016/0326845 A1* | 11/2016 | Djikpesse | E21B 43/00 |
| 2017/0192115 A1 | 7/2017 | Baker | |
| 2018/0010443 A1* | 1/2018 | Lu | E21B 47/113 |
| 2019/0170897 A1* | 6/2019 | Zhang | E21B 43/267 |
| 2019/0243025 A1* | 8/2019 | Wlodarczyk | G01V 3/38 |
| 2019/0302307 A1* | 10/2019 | Arbus | E21B 7/10 |

OTHER PUBLICATIONS

Cipolla, C. et al., "New Algorithms and Integrated Workflow for Tight Gas and Shale Completions", SPE 146872, presented at the SPE Annual Technical Conference and Exhibition, Denver, Colorado, U.S.A., 2001, 18 pages.

Gamero-Diaz, H. et al., "Evaluating the Impact of Mineralogy on Reservoir Quality and Completion Quality of Organic Shale Plays", AAPG, Search and Discovery Article #41221, 2013, 5 pages.

* cited by examiner

FIG. 3.1
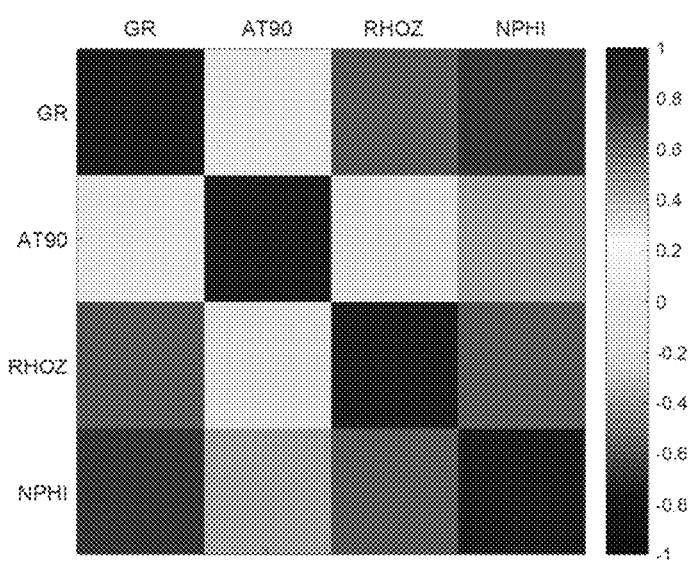
FIG. 3.2
Correlations:
1.0000  -0.0434  -0.5819   0.7445
-0.0434  1.0000  -0.1342  -0.3885
-0.5819 -0.1342   1.0000  -0.5740
 0.7445 -0.3885  -0.5740   1.0000

FIG. 3.3
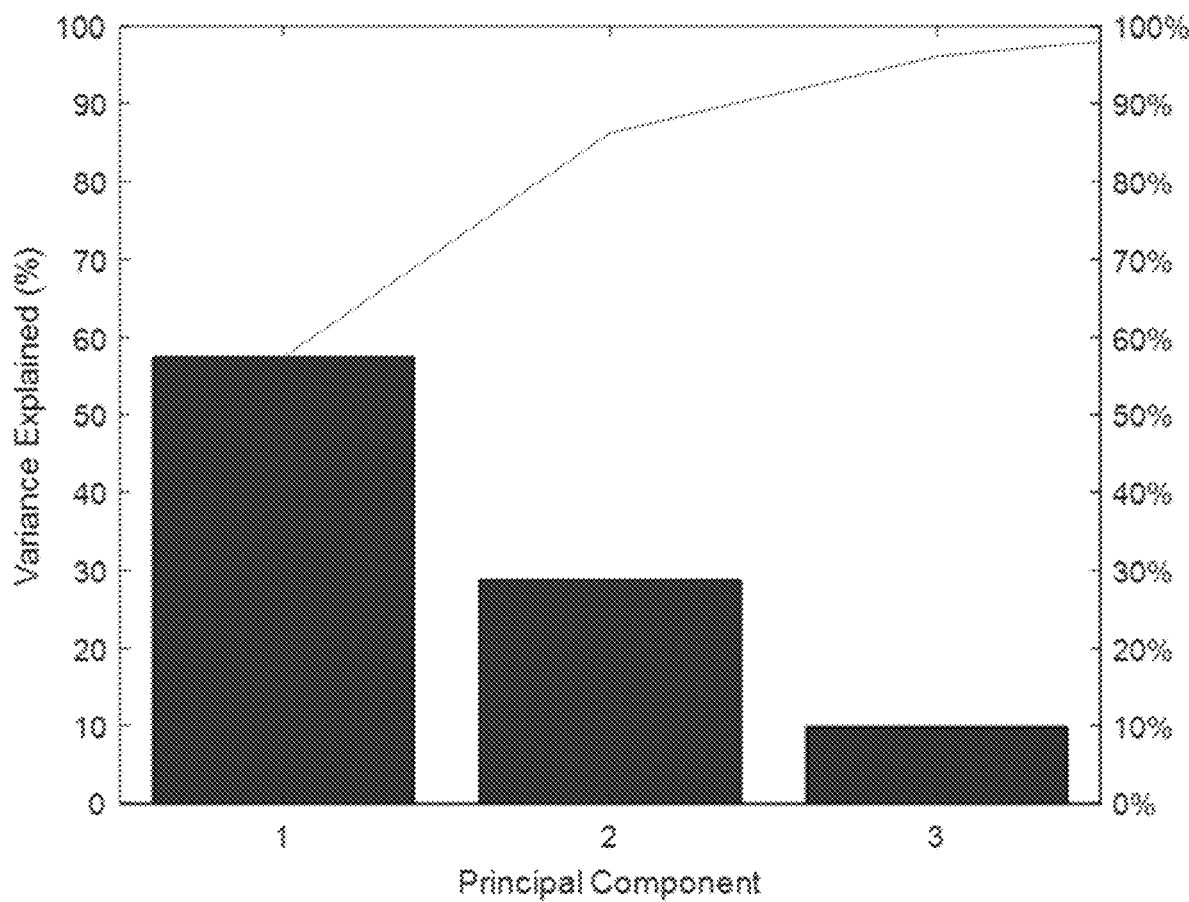

FIG. 4.1
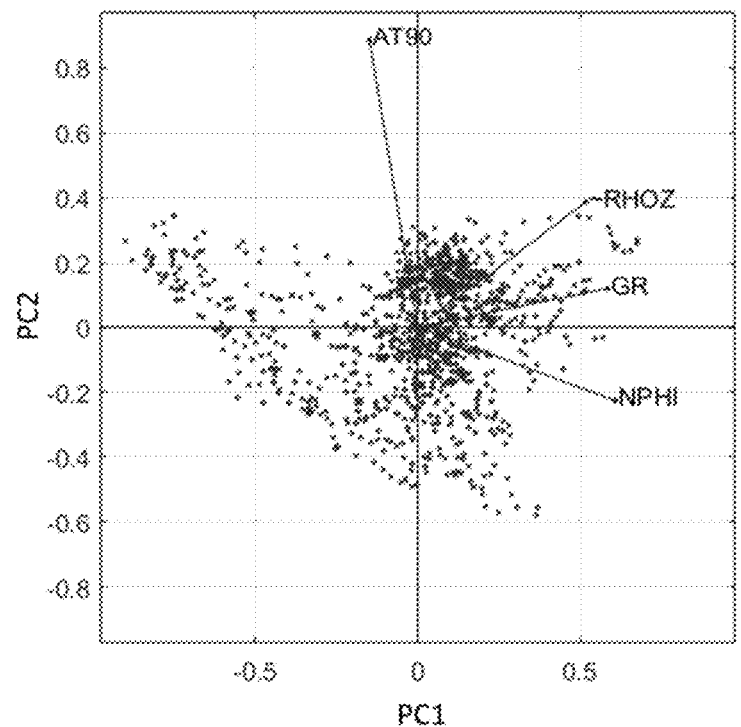
FIG. 4.2
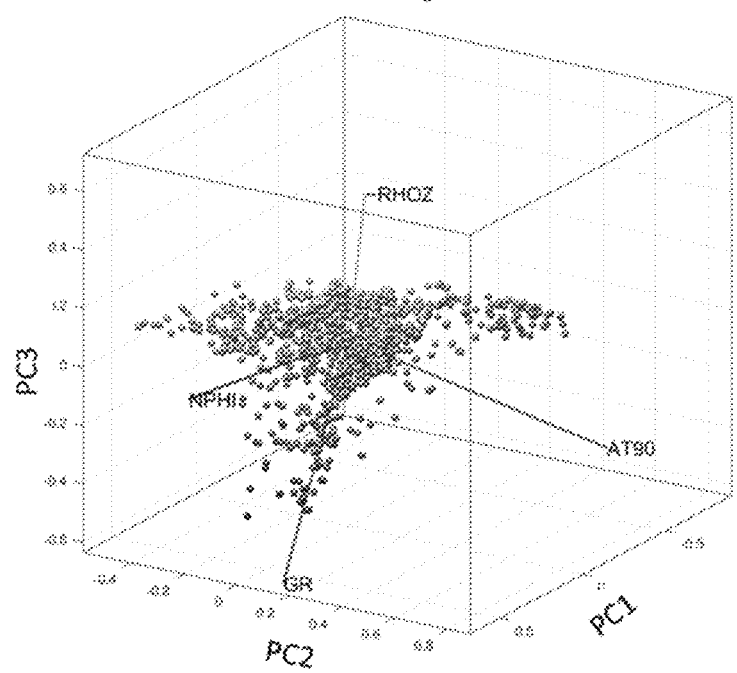

FIG. 7.1
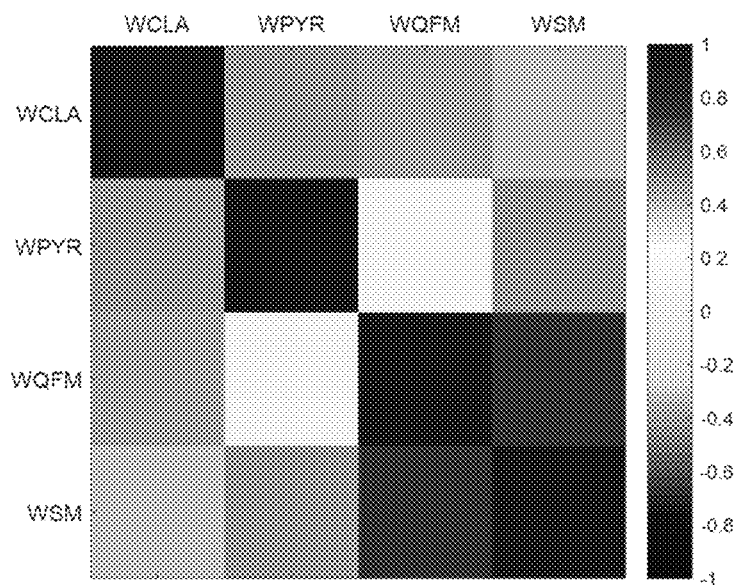
FIG. 7.2
Correlations:
1.0000   0.4835   0.4459   0.3871
0.4835   1.0000   0.2634   0.4944
0.4459   0.2634   1.0000   0.7604
0.3871   0.4944   0.7604   1.0000

FIG. 7.3
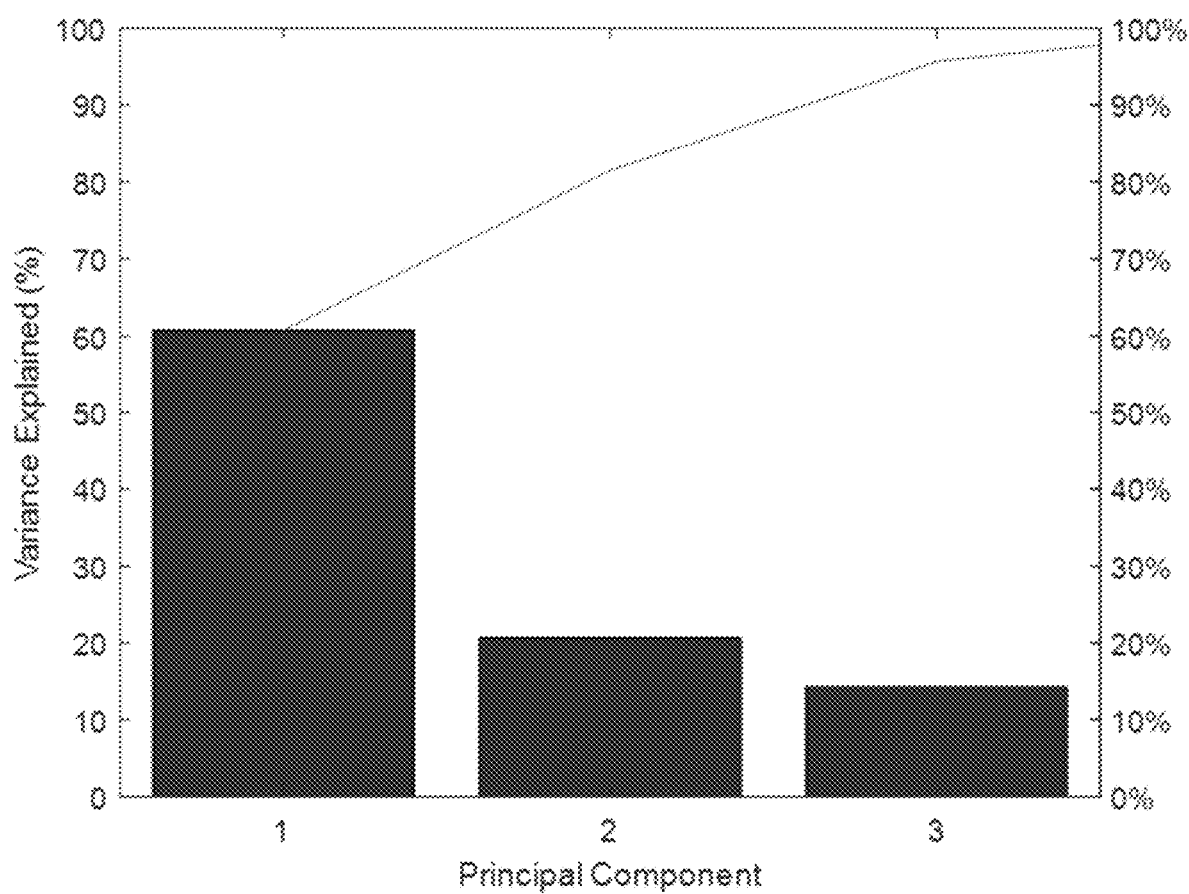

FIG. 8.1
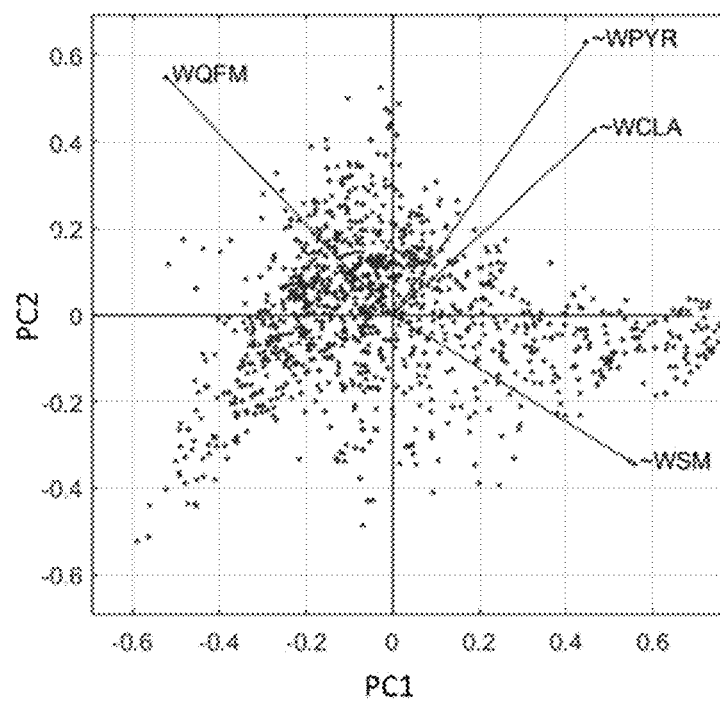
FIG. 8.2
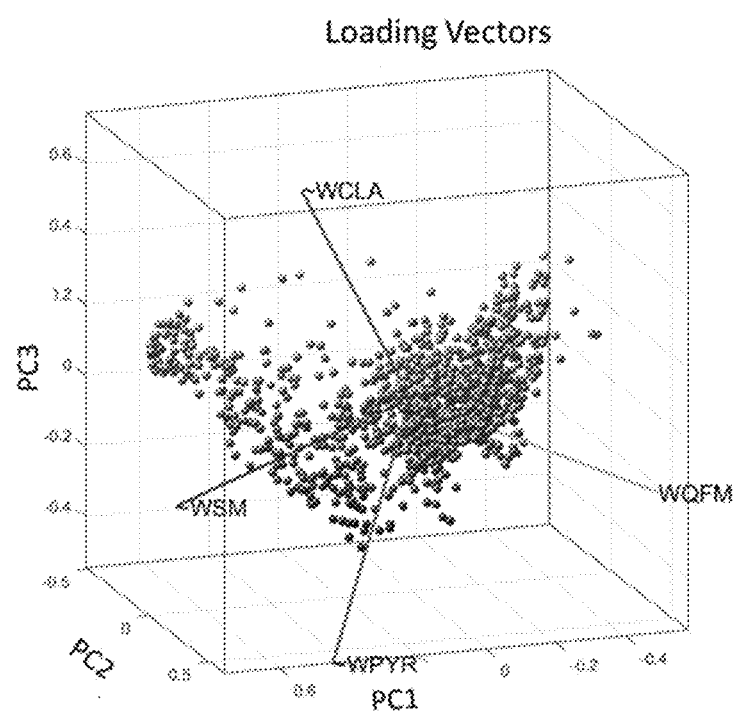

US 11,112,516 B2

DATA FUSION TECHNIQUE TO COMPUTE RESERVOIR QUALITY AND COMPLETION QUALITY BY COMBINING VARIOUS LOG MEASUREMENTS

BACKGROUND

Identification of regions in a formation that contain hydrocarbons is one of the primary goals of oil and gas exploration. One way to identify the hydrocarbon reservoirs within a subterranean formation, also referred to as hydrocarbon pay, is from differential responses of various logging tools along a wellbore. Wellbore tools may also identify other qualities of interest such as rock composition, anisotropic structures, water saturation, and other features that can aid wellbore operations such as completions, stimulation, production, and the like. Common logging tools may include electrical tools, electromagnetic tools, acoustic tools, nuclear tools, and nuclear magnetic resonance (NMR) tools, and a number of others.

As the number of wellbore tools used to study a formation increases, more data is generated that must be sorted and analyzed, which can impart additional time and expense in order to evaluate the information from each tool. In addition to sheer data volume, individual tools may be more or less susceptible to error and methods are needed to identify and correct for data redundancy across multiple wellbore logs in order to efficiently identify wellbore zones that may contain economically viable pay and potential completion zones.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to methods that may include normalizing two or more wellbore logs obtained from the output of two or more wellbore tool surveys of a wellbore in a formation of interest; inputting two or more wellbore logs into a correlation matrix; assigning each of the two or more wellbore logs a positive or negative value based on the impact on a selected wellbore quality; performing a principal component analysis of the two or more wellbore logs to obtain one or more loading vectors; computing weighting factors for each of the two or more wellbore logs from the one or more loading vectors; and generating a quality index by linearly combining the two or more wellbore logs using the computed weighting factors.

In another aspect, embodiments disclosed herein relate to methods that may include normalizing two or more wellbore logs obtained from the output of two or more wellbore tool surveys of a wellbore in a formation of interest; inputting two or more wellbore logs into a correlation matrix; assigning each of the two or more wellbore logs a positive or negative sign based on the impact on a selected wellbore quality; performing a principal component analysis of the two or more wellbore logs to obtain one or more loading vectors; computing weighting factors for each of the two or more wellbore logs from the one or more loading vectors; generating a reservoir quality log by linearly combining the two or more wellbore logs using the computed weighting factors; generating a completion quality log by linearly combining the two or more wellbore logs using the computed weighting factors; and preparing a composite reservoir quality index from the product of the reservoir quality log and the completion quality log.

Other aspects and advantages of the claimed subject matter will be apparent from the following description and the appended claims.

BRIEF DESCRIPTION OF DRAWINGS

FIG. 3.1 is a correlation map for a number of logs in accordance with embodiments of the present disclosure;

FIG. 3.2 is a correlation matrix for a number of logs that are used as example input for reservoir quality (RQ) in accordance with embodiments of the present disclosure;

FIG. 3.3 is a graphical representation of the first three principal components for a number of logs that are used as example input in accordance with embodiments of the present disclosure;

FIGS. 4.1 and 4.2 are graphical representations depicting the projection of data measurements and loading vectors in principal component space represented in two dimensions and three dimensions, respectively, in accordance with embodiments of the present disclosure;

FIG. 7.1 is a correlation map for a number of logs that are used as example input for completion quality (CQ) index computation in accordance with embodiments of the present disclosure;

FIG. 7.2 is a correlation matrix for a number of logs as example input in accordance with embodiments of the present disclosure;

FIG. 7.3 is a graphical representation of the first three principal components for a number of logs as example input in accordance with embodiments of the present disclosure;

FIGS. 8.1 and 8.2 are graphical representations depicting projection of data measurements in principal component space represented in two dimensions and three dimensions, respectively, in accordance with embodiments of the present disclosure;

DETAILED DESCRIPTION

In one aspect, embodiments in accordance with the present disclosure are directed to a data analytic approach to compute a continuous quality index from a linear combination of available log measurements from an interval of interest in a wellbore traversing a subterranean formation that accounts for data redundancy across multiple information sources. In another aspect, embodiments disclosed herein relate to data fusion techniques that combine multiple wellbore log measurements and/or other digital data to compute wellbore quality indices automatically. In one or more embodiments, wellbore quality indices may include continuous reservoir quality (RQ), completion quality (CQ), and composite quality indices (QI), and the like.

Methods in accordance with the present disclosure may be used to quantify, improve, and automate computation of reservoir quality and completion quality evaluation, interpretation, and mapping by combining multiple log measurements. Previous approaches have used arbitrary binary threshold cutoffs of independent wellbore measurements to compute flags for specified wellbore qualities (often reservoir quality) that may be applied to other wellbore log measurements over the same interval. However, approaches that generate binary flags from a series of single source of wellbore information are susceptible to the propagation of errors from individual wellbore logs, which can lead to fewer identified intervals of interest and less certainty of specified quality within the flagged interval. The major limitation of applying binary thresholds to individual wellbore logs is that intervals within the wellbores are labeled as "good" or "bad" quality and then the "good" intervals are flagged if they are "good" across all logs. This leads to smaller and fewer "good" reservoir intervals as more measurements become available, which is counterintuitive and unreasonable for reservoir interpretation.

In one or more embodiments, methods may include generating one or more continuous wellbore quality indices by assigning optimal weights to a grouping of wellbore measurements for an interval or reservoir of interest, such that highly correlated logs share weighting factors, while more independent logs are assigned higher weighting factors. This method is contrasted with prior approaches to evaluate RQ and CQ that apply binary threshold cutoffs to logs to denote "good" or "bad" qualities without taking log dependence/redundancy for multiple log measurements into account.

Figure 1:
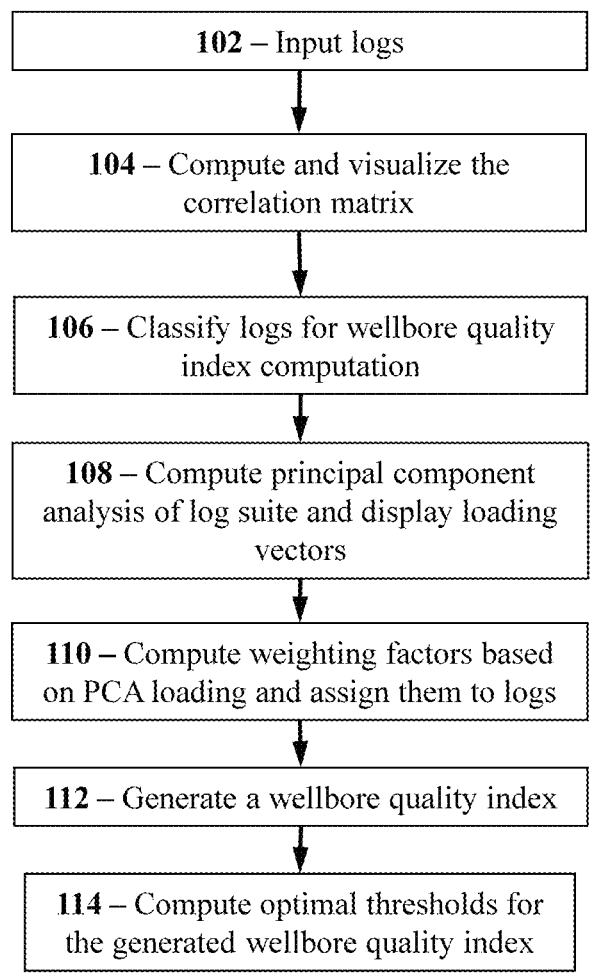
FIG. 1 is a flow diagram depicting a method in accordance with embodiments of the present disclosure.

With respect to FIG. 1 a general flow diagram is shown for a method to generate continuous wellbore quality indices through linear combination of available log measurements and/or other digital data, which utilizes weighting factors to minimize data redundancy. Beginning at 102, wellbore measurements are collected from available wellbore logs from any number of wellbore tools and other digital data. At 104, the wellbore measurements are input into a correlation matrix during exploratory data analysis (EDA). The correlation matrix is established by organizing available wellbore data using a diagnostic tool that computes and displays a color-coded pair-wise matrix to aid user classification of the available wellbore measurements into groupings that provide information for a given wellbore quality being studied. The established correlation matrix may provide users with an intuitive visualization that allows the separation of available wellbore measurements into distinct groups for subsequent analysis based on the degree of cross correlation for subsequent analysis. In some embodiments, wellbore logs may be grouped based on the criteria of minimizing variation within individual well log groups, while maximizing the variation across different groups.

At 106, wellbore measurements may be grouped according to user-defined criteria to generate quality indices that are tailored to a particular application, such as RQ and/or CQ. During EDA, wellbore logs are assigned positive "+" and "−" negative signs depending on whether they contribute to the wellbore quality of interest positively or negatively. General petrophysical understanding and local knowledge about the studied reservoir may also help the determination of the signs. In some embodiments, the correlation matrix may prompt users to determine sign selection in sequence. For example, a user may be prompted to assign signs to sequential logs based on the order of confidence in the accuracy of the log data; the sequential logs may then be assigned a positive or negative sign dependent on the degree of correlation to the first log. Positive correlations suggest that the compared wellbore logs have the same sign, while negative signs may be applied to negative correlations.

The grouped wellbore measurements are then processed by principal component analysis (PCA) at 108. In one or more embodiments, wellbore logs that have been assigned signs may then be processed by PCA to determine the principal components (PC) and corresponding loading vectors for the data set. PCA transforms the wellbore data from the original axes to principal axes. The first principal axis is the direction in which the data are primarily distributed, or the "long" axis of the distribution in n-dimensional space.

In one or more embodiments, the number of principal components may be varied. In some embodiments, a PCA may retain the first three PCs, and the respective loading vectors may be displayed to show the redundancy among the logs. PCA results may be plotted in 2D or 3D in PC space. The plotted data may be used to generate loading vectors for the input wellbore measurements, which are used for data dimension reduction and/or characterization of variance. While embodiments of the present disclosure are discussed using linear PCA, there are other methods that could be substituted for linear PCA, including, but not limited to, non-linear or kernel PCA, and similar other dimension reduction tools.

Following PCA, estimation tools such as the Kriging estimator may be applied in PC loading space to measures the redundancy of the logs and compute weighting factors at 110. Kriging estimators are known from use as a fundamental estimation tool in geostatistics, and is described, for example, in E. H. Isaaks and R. M. Srivastava, 1989, *An Introduction to Applied Geostatistics*, Oxford University Press. In one or more embodiments, a Kriging estimator is used and applied to the loading vectors of log measurements using a covariance model with spatial anisotropy determined by the variance of each individual PC identified, which is then used to generate weighting factors for all available logs.

After weighting factors for each of the wellbore logs are calculated, the logs may be combined linearly to generate the continuous wellbore quality index at 112, such as an RQ log or CQ log. In one or more embodiments, users can apply a threshold cutoff at 114 to a generated wellbore quality index to designate intervals having specified characteristics, such as indicating the presence of pay zones or intervals suitable as completion targets.

Methods in accordance with the present disclosure may be automated in some embodiments using supervised learning (machine learning) from previous log results. For example, if a user wants to employ a continuous quality index resulting from the analysis of multiple well logs to interpret various intervals of interest such as pay zones or completion targets, an interactive method may be employed to assist the optimization of a threshold for a given quality index. Automated methods may be trained by setting a user-defined optimal threshold value for a wellbore quality such as RQ, and the target intervals may be computed. Thus, a binary solution can be created from one or two quality indices, while retaining the continuous estimates of wellbore quality (RQ and CQ, for example).

If a flagged interval of interest is known and a well log already exists in a well, the threshold values used to flag the interval may be used for machine learning, which may minimize the misclassification rate by an iterative process with user input or automatically optimizing the threshold value for generated quality indices. The misclassification rate is the ratio between the number of data points that are classified incorrectly when comparing with the known pay flagged values and the total number of samples in the studied zone. In one or more embodiments, optimized threshold values computed in the training well containing a flagged interval of interest may be applied to neighboring wells or wells in similar formations.

EXAMPLES

The following examples are presented to illustrate the overall method of generating a wellbore quality index for a number of wellbore qualities, and should not be construed to limit the scope of the disclosure, unless otherwise expressly indicated in the appended claims. Even though the methodology is explained by logs in vertical wells, it can be applied to logs or measurements from wells in any orientation. The method can be similarly applied to the analysis of real-time drilling measurement data when the data are acquired in sequential time frames.

Example 1: Reservoir Quality Analysis

In this example, nine log measurements were obtained from a vertical well and used to establish a continuous log of reservoir quality (RQ). The sample logs include gamma ray (GR, gAPI), deep resistivity (AT90, ohm*m), bulk density (RHOZ, g/cm3), thermal neutron porosity (NPHI, v/v), carbon weight fraction (WCAR, lbf/lbf), clay weight fraction (WCLA, lbf/lbf), pyrite weight fraction (WPYR, lbf/lbf), quartz-feldspar-mica weight fraction (WQFM, lbf/lbf), and total organic carbon weight fraction (WSM, lbf/lbf). The studied interval is 500 feet in measured depth. Other logs which may be used for reservoir quality are neutron (TNPH); spectroscopy mineralogy logs: Anhydrite (WANH), Calcite (WCLC), Dolomite (WDOL), Evaporite (WDOL), Pyrite (WPYR), Matrix Grain Density (RHGE); and NMR: NMR porosity (MRP), permeability (KSDR).

Generating Correlation Matrix

Figure 2:
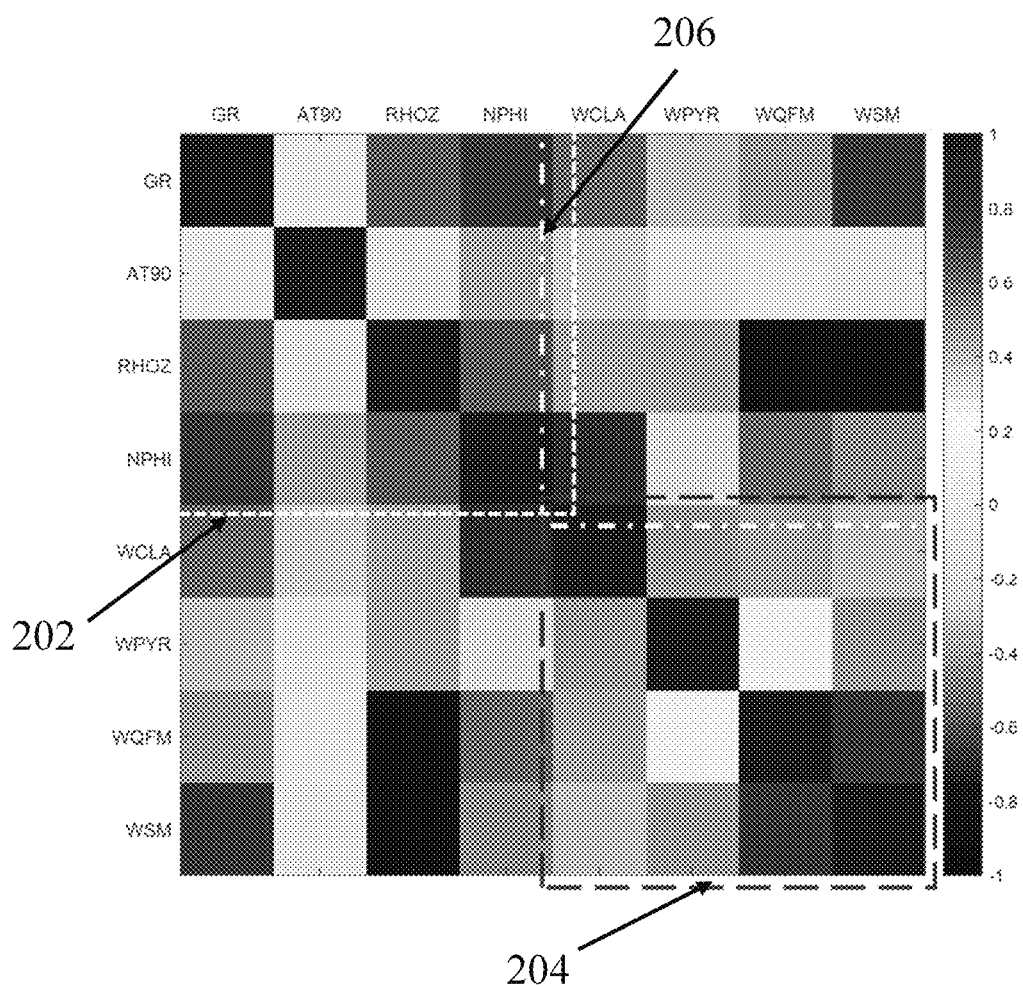
FIG. 2 is an illustration depicting an example of a pair-wise correlation matrix used to analyze wellbore measurements in accordance with embodiments of the present disclosure. The bar on the right indicates the level of positive or negative correlation between measurement pairs.

With particular respect to FIG. 2, a pair-wise correlation matrix was calculated and generated as a map for all available wellbore logs as a visualization tool to depict the correlation between the values in pairs of the respective logs. In the correlation matrix, the bar legend shows the correlation among the logs from negatively correlated values (−1) to positively correlated values (+1). The correlation matrix was used to separate the logs into two groups based on the strength of the correlation between the groups. Based on common petrophysical understanding about reservoirs, the logs in the first group 202 are examples of logs that can be good indicators of reservoir quality and were used to generate a continuous log of reservoir quality (RQ): GR, AT90, RHOZ, and NPHI. The second group 204, is directed to logs of mineral concentrations that were used to generate a continuous log of completion quality (CQ), which indicates regions of the wellbore that may be good targets for stimulation and completion operations: WCLA, WPYR, WQFM, and WSM. In addition to the mineralogy logs, sonic log and other logs relating to rock geomechanics properties could be used. In this example, the groups selected were representative of the respective quality logs RQ or CQ, however, highly redundant logs could be removed and remaining logs can be regrouped and reordered to form a new correlation matrix depending on the job requirements. The correlations between the logs for RQ and logs for CQ lie inside the dashed box 206.

Principal Component Analysis

The next step is to pick the groups of logs for either RQ or CQ computation. As an illustration of RQ computation, we chose four logs (GR, AT90, RHOZ, NPHI). Principal component analysis (PCA) is applied to determine the principal component (PC) vectors that explain most of the total variance in the dataset. PCA is a technique that is widely used for applications such as dimension reduction, data compression, feature extraction, and data visualization.

Before applying PCA, a positive sign "+" or a negative sign "−" needs to be specified for each individual log measurement to indicate whether the corresponding measurement contributes to a composite index positively or negatively. In this example, three of the four logs have a positive sign "+", while the density log (RHOZ) has a negative sign "−". The physical reason for the negative correlation of density to RQ is that hydrocarbon in pore space of a rock is less dense than the surrounding rock and reduces the rock bulk density. Negatively correlated logs are flipped by subtracting the original log measurements from their maximum values.

Next, all log measurements are converted into dimensionless values through Z-score transformation. This is required since different types of logs commonly have different units and different ranges of measurement. Z-score transformation of a data vector x is defined in Eq. (1), in which the mean is subtracted from the data vector and then divided by the standard deviation of the data. It is worth noting that for resistivity log AT90, a logarithmic transformation is applied first before Z-score transformation to reduce skewness in the resistivity data measurements.

$$Z = \frac{x - \text{mean}(x)}{\text{std}(x)} \quad (1)$$

PCA involves evaluating the correlation matrix R of the data set first, which are defined in Eq. (2), where zn (n=1, N) is the Z-score transformed log using equation (1) and each contains L measurements, which usually corresponds to the total samples in studied depth interval.

$$R = \frac{1}{N}\sum_{n=1}^{N} z_n z_n^T \quad (2)$$

The dimension of the correlation matrix R is N×N. In our example, N=4 and L is the total measurement data points, and $z_n^T$ is the transpose of $z_n$.

Next, PCA is performed to find the M(M<N) eigenvector $u_i$ of R corresponding to the M largest eigenvalues $\lambda_i$ by Eq. (3), where eigenvectors $u_i$ are chosen to be orthogonal with unit length.

$$Ru_i = \lambda_i u_i \quad (3)$$

It can be observed from equation (3) that searching for the eigenvectors is equivalent to covariance matrix diagonalization, which amounts to rotating the original N-dimensional data space to a new system with all the eigenvectors $u_i$ as the basis. Along each axis identified by one eigenvector, the data spread or variation is measured by its eigenvalue, typically ranking in descending order: $\lambda_1 \leq \lambda_2 \leq \ldots \leq \lambda_N$ and satisfying the condition set forth in Eq. (4), where $\sigma^2$ represents the total variance of the data.

$$\lambda_1 + \lambda_2 + \ldots + \lambda_N = \sigma^2 \quad (4)$$

With particular respect to FIG. 3.1, the correlation map for four selected logs is shown, while the corresponding correlation matrix is shown in FIG. 3.2, and the first three principal components that explain more than 90% of the total variance of the data are shown in FIG. 3.3. In this example, the first three PCs explain more than 90% of the total variance, thus, only the first three PCs are retained for further analysis. However, more or fewer PCs may be used depending on the degree of accuracy needed for the particular application.

Next, let $U=(u_1, u_2, \ldots u_n)$ represent the N eigenvectors, and $A=\text{diag}(\lambda_1, \lambda_2, \ldots, \lambda_N)$ is the diagonal matrix of N eigenvalues. The relationship may be described by (5), where U has dimension of N×N and is also an orthogonal matrix satisfying $UU^T=I$, with I being a N×N identity matrix. $U^T$ is the transpose of the matrix U.

$$R = UAU^T \quad (5)$$

Once eigenvectors $u_i$ (i=1, ..., N) are obtained, principal component (PC) vectors are computed by multiplying eigenvectors by the data matrix as shown in Eq. (6), where D is a L×N data matrix; U is a N×N matrix of the eigenvectors; resulting V is a L×N matrix with columns being the PC vectors.

$$V = DU \quad (6)$$

The values in the n-th column of the eigenvector matrix U is called the loading of n-th log measurement (variable) (n=1, ..., N) on all the principal components. If the first M (M<N) eigenvectors are retained, U becomes N×M matrix, data matrix D stays the same and V will be L×M matrix, leading to only the first M PC vectors considered. Larger loadings, which could be either positive or negative, indicate that the corresponding log measurements are more significant than others in the explanation of the total data variation.

With respect to FIG. 4.1, the first two principal components for the four log data measurements (GR, AT90, RHOZ, NPHI) is shown in 2D space, and their corresponding loading vectors is shown, while FIG. 4.2 shows the first three principal components in 3D space. The 3D plot allows users to visualize the magnitude and sign of each variable's (log measurement in our example) contribution to the first two or three principal components, and how each observation is represented in terms of those components. The plot scales the principal components so that they fit on the plot: It divides each principal component by the maximum absolute value of all the components, and multiplies by the maximum value of all the eigenvectors. The scaled data are used for further analysis In FIGS. 4.1 and 4.2, prefix "~" before the bulk density log name "RHOZ" indicates that RHOZ contributes to the RQ negatively, hence its complementary value is considered in the PCA analysis. In PCA, the significance of each individual log measurement can be measured by the length of its corresponding loading vector, while the redundancy among all the logs can be measured by their relative closeness in PC space, which may be determined by the angles between any pair of loading vectors.

Weighting Factor Derivation

Weighting factors for each of the wellbore logs are derived by removing log redundancy. Highly correlated logs are given smaller weights, while divergent logs are assigned higher weights. While linear PCA is used in these examples for data reduction, there are other methods that could be substituted for linear PCA, including non-linear or kernel PCA, or any other suitable dimension reduction tools.

In this example, the PC loading vector displays in FIGS. 4.1 and 4.2 suggest that the resistivity log (AT90) is separated from the other logs (GR, RHOZ, and NPHI), which is an indicator that AT90 exhibits more data variation and should be weighted more when combining the logs to infer the reservoir quality (RQ). On the other hand, the other three logs should share the weights due to the redundancy exhibited in the PCA analysis.

Kriging Analysis of PC Loading Vectors

After PCA analysis of all the log measurements and obtaining their loading vectors, a Kriging Estimator is applied on the loading vectors in the PC space in FIGS. 4.1 and 4.2. The Kriging estimator serves as a spatial interpolator by linearly combining spatial data at known locations to infer the studied property at any unknown location through optimal determination of the weighting factors as shown in Eq. (7), where $Z_i$ (i=1, 2, ..., N) represents spatially correlated random variables at N known locations; and Z* is estimated variable by a linear combination of all the random variable with the corresponding weighing factor $\omega_i$.

$$Z^* = \Sigma_{i=1}^{N} \omega_i Z_i \quad (7)$$

The optimum weighting factors $\omega_i$ (i=1, 2, ..., N) are then chosen to minimize the expected error in a least square sense as shown in Eq. (8), where Z is the true value at an unknown location but it is not available and will be estimated; E represents the expectation of the squared error between the estimator and the true value; and $\sigma_{SK}^2$ is the resulting error or Kriging variance.

$$\sigma_{SK}^2 = \min E(Z - Z^*)^2 \quad (8)$$

Further mathematical derivation of equation (8) leads to the following Kriging equation shown in Eq. 9, where the Kriging matrix at the left hand consists of pair-wise covariance $C_{ij}$ (i, j=1, 2, ..., N) between two random variables $Z_i$ and $Z_j$.

$$\begin{bmatrix} C_{11} & \cdots & C_{1N} \\ \vdots & \ddots & \vdots \\ C_{N1} & \cdots & C_{NN} \end{bmatrix} \begin{pmatrix} \omega_1 \\ \vdots \\ \omega_N \end{pmatrix} = \begin{pmatrix} C_{01} \\ \vdots \\ C_{0N} \end{pmatrix} \quad (9)$$

The column vector at the right hand side ($C_{0j}$) (j=1, 2, ..., N) measures the dependence between each variable at the known locations with the unknown. The Kriging matrix itself is a measure of the data redundancy, such that more spatially isolated data are assigned larger Kriging weights while spatially clustered data share the weight.

To solve a Kriging system, a covariance function is usually required to determine the correlation matrix and the correlation vector in equation (9). The covariance function determines the spatial anisotropy of the data in 3D once three orthogonal main directions are specified and the corresponding correlation range along each direction is provided. In practice in Kriging estimation, an experimental covariance from known data is computed and then fit by parametric covariance functions to generate a theoretical covariance function model for solving the Kriging system above. Once the Kriging weights in equation (9) are determined, Kriging estimation can be computed by plugging the weights into equation (7).

Continuing the above example, Kriging theory is applied to the loading vectors in principal component space as shown in FIGS. 4.1 and 4.2. The estimated location is set to be at the origin of the coordinate system (0, 0, 0). Because the weighting factors in Kriging system are determined by the proximity of each datum to the estimated location, the data points (the four loading vectors) are converted by their inverse distances to the origin of the coordinate, multiplied by the summation of lengths of all loading vectors. This reciprocal transformation does not change the angles between any two loading vectors, but reverses the length of each loading vector, such that loading vectors with longer lengths are shortened. As a result, the loading points are closer to the origin in the reciprocal transformation and, consequently, their corresponding logs receive more weight.

In the next step, a covariance model required by Kriging estimator is used to measure the data dependency and/or redundancy in the reciprocal space of PC loadings. In one or more embodiments, a covariance model may be chosen such that:

(i) The three major directions are chosen as the three principal component directions of the data by PCA analysis, and the three major correlation axes are chosen as: the third PC direction, the second PC direction, and the first PC direction in order, because of reciprocal transformation of PC loading vectors as discussed above.

(ii) The three correlation ranges in the three major directions are set as shown in Eq. (10), where $\hat{\sigma}^2=(\lambda_1+\lambda_2+\lambda_3)$ represents the total variance explained by the first three principal components and $\lambda_i$ (i=1, 2, 3) are the three eigenvalues discussed above. It is seen that $R_1 \geq R_2 \geq R_3$ because $\lambda_1 \geq \lambda_2 \geq \lambda_3$.

$$R_1 = \frac{\hat{\sigma}^2}{\lambda_1}, R_2 = R_1 \frac{\lambda_2}{\lambda_1}, R_3 = R_1 \frac{\lambda_3}{\lambda_1} \qquad (10)$$

(iii) The covariance function is proposed as an exponential function shown in Eq. (11).

$$C(h) = \hat{\sigma}^2 * e^{\left(-\frac{h}{3.0}\right)} \qquad (11)$$

The correlation range is set to 3.0 in Eq. (11), which represents three times the standard deviation of a random normal Gaussian variable.

Generation of Reservoir Quality Index

In the next step, an RQ index is generated by the linear combination of the four wellbore logs. Kriging weights are calculated by solving the linear system in equation (9) using the covariance model proposed in equations (10) and (11) in reciprocal space of loading vectors. All the weights are normalized so they sum to 1.0.

Continuing the above example, four weighting factors corresponding to the four normalized logs are generated, and multiplied by the four normalized logs. The input log measurements are each normalized by subtracting each value by the minimum value from its original log measurement for each log and divided by its range as shown in Eq. (12).

$$x_{normalized} = \frac{x - x_{min}}{x_{max} - x_{min}} \qquad (12)$$

This normalization constrains each log between 0 and 1. The final wellbore quality index generated by applying the Kriging weights to the normalized logs, which produces a unitless composite measure between 0 and 1 with higher values representing an increase in the studied quality (reservoir quality in this example).

Figure 5:
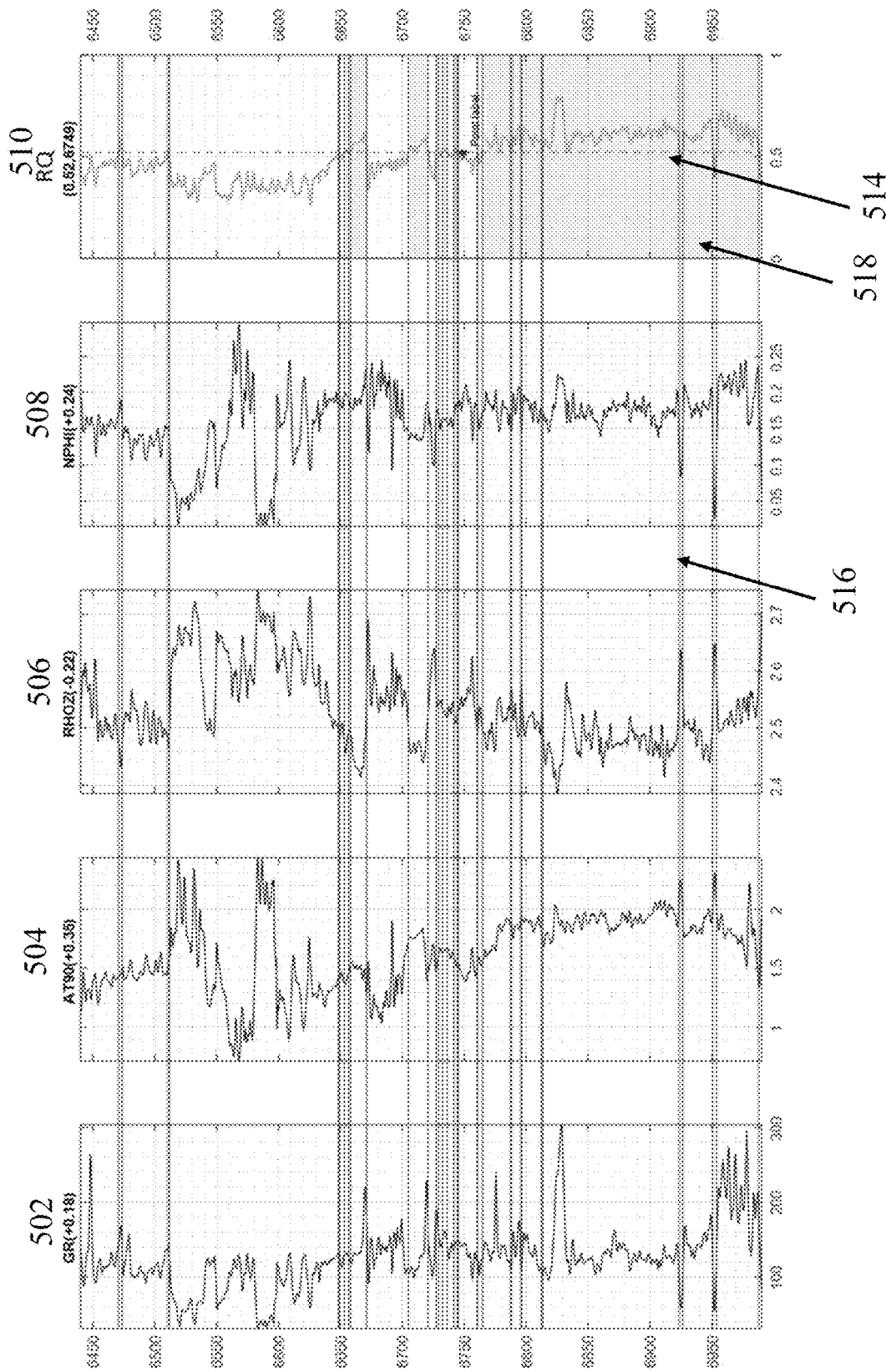
FIG. 5 is a graphical representation showing a continuous RQ index generated by linearly combining four well log measurements in accordance with embodiments of the present disclosure.

With respect to FIG. 5, a continuous RQ index 510 is generated by linearly combining four well log measurements: gamma ray (GR) 502, deep resistivity (AT90) 504, bulk rock density (RHOZ) 506, and thermal neutron porosity (NPHI) 508. Linear combination is performed by weighting the wellbore logs according to the respective weights calculated from a Kriging estimator: 0.18 for GR, 0.35 for AT90, −0.22 for RHOZ, and 0.24 for NPHI. A positive weighting factor (GR, AT90, and NPHI) indicates that the log measurement is positively correlated with RQ, while a negative weighting factor (RHOZ) correlates negatively with RQ. The magnitudes of the weighting factors suggest that the induction AT90 has the most impact on the RQ while the GR log has the least influence. In this case, lower bulk density, RHOZ, indicates higher RQ, because hydrocarbon in pores are less dense than rock mineral grains.

Continuous wellbore quality logs in accordance with the present disclosure may also be modified with a user-defined threshold, which may facilitate the identification of regions of interest. In this example, the RQ index generated can be used to flag reservoir pay zones by setting a user-defined RQ threshold. In one or more embodiments, the selection of a threshold value may be an iterative, user-defined process. By adjusting the threshold value, intervals can be determined and displayed that correspond to the zone with RQ above the threshold (shaded regions 518). Some criteria such as a specified 70% pay zone could be used by the user to find the respective threshold.

An RQ index may be used, for example, to predict pay intervals by setting a threshold of reservoir quality to flag regions of interest that may be economically viable. This thresholding can be done interactively by the user by applying a binary threshold cutoff to identify an interval of interest (a pay flag in this example, shaded regions 518) above the threshold value. With respect to FIG. 5, RQ index 510 is modified by the addition of threshold 514 of 0.52, which may be visually indicated by shaded intervals of interest 518. Further, horizontal lines 514 across all logs may be used to represent the corresponding pay zone boundaries. Thresholding could also be used to generate other forms of reservoir information, including pay flag proportion for a measured wellbore interval or within a formation interval of interest.

Wellbore quality index generation may be automated with weighting factors computed from PCA analysis of the log measurements, followed by Kriging analysis applied to the corresponding loading vectors. In some embodiments, sign selection of the wellbore logs may be used to train the algorithm to calculate the optimal weights. The final continuous quality index then aids selection of intervals of interest. For example, as observed in RQ index 510 the lower interval from 6760 feet to 6990 feet contains better reservoir quality than the upper interval of the studied reservoir log.

It is worth noting that within the formation interval from 6500 to 6650 feet, each of the three logs AT90, RHOZ and NPHI contains both their minimum and maximum values of the corresponding log across the entire interval from 6440 to 6990 (approximately the upper half of the displayed interval). If one were to use conventional binary thresholding techniques on each individual wellbore log, this would identify the entire interval as good quality. However, by using methods in accordance with the present disclosure the RQ index indicates that the same interval is low RQ because of the automatic removal of the log redundancy and optimal weighting factor computation.

In instances where regions of interest such as pay flags are provided, optimal thresholding of the continuous RQ index may be computed by supervised machine learning methods by minimizing the misclassification rate by adjusting the cutoff value.

Figure 6:
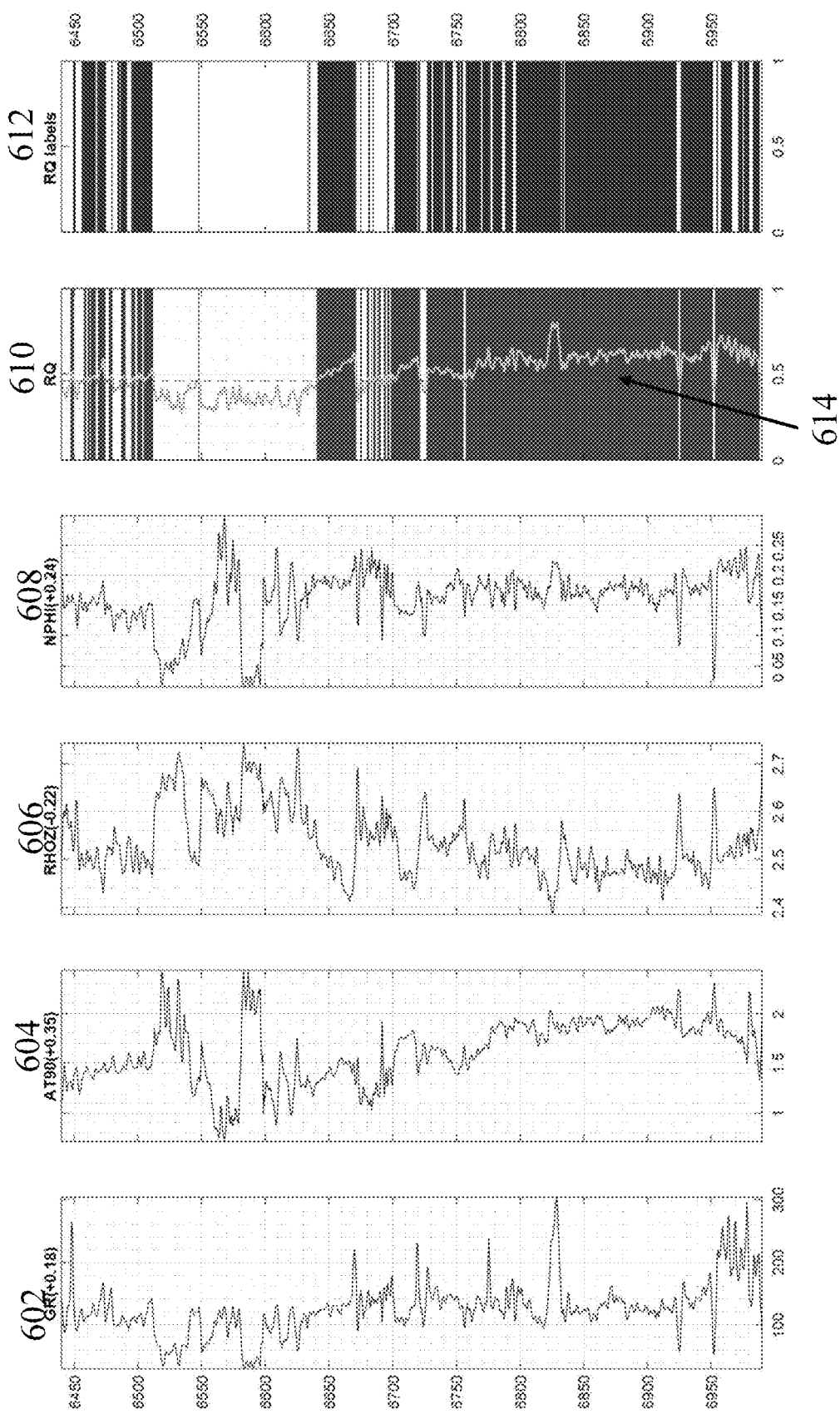
FIG. 6 is a graphical representation showing a continuous RQ index with appended pay flags generated by linearly combining four well log measurements with weighting factors applied and followed by applying an optimal thresholding value in accordance with embodiments of the present disclosure.

With respect to FIG. 6, an example is shown in which a pay flag interpretation 612 is available. RQ index 610 is generated by linearly combining four well log measurements: gamma ray (GR) 602, deep resistivity (AT90) 604, bulk rock density (RHOZ) 606, and thermal neutron porosity (NPHI) 608. In log 612, pay intervals determined by a supervised classification method are indicated by shaded region. Optimal thresholding value 0.46 (dashed line 614) was determined by minimum misclassification value determined by the classification algorithm using the continuous RQ log as input compared with the supplied known examples. Pay labels in 612 may be obtained, for example, by petrophysicists using a potentially more extensive suite of measurements from well logs and possibly core or cuttings samples, leading to comprehensive, data-rich interpretations. Such comprehensive analyses and interpretations are common in key wells or pilot wells in a hydrocarbon field study. These results are commonly propagated to less data-rich wells in a field.

Example 2: Generation of CQ Index

In the next example, the workflow described above is applied to compute completion index from a suite of wellbore logs indicating various mineral concentrations and other factors that impact the success of various completion techniques. In addition to reservoir quality evaluation, knowing the completion quality is critical for hydraulic fracturing in low porosity reservoirs. Determination of both good RQ and good CQ helps identification of sweet spots in developing and production of unconventional reservoirs. Four mineral logs are selected in this example for CQ computation: clay (WLCA), pyrite (WPYR), quartz-feldspar-mica (WQFM), total organic carbon (WSM), and all are measured in weight fraction. Other logs which may be used for CQ computation include: Gamma Ray (GR), Resistivity (AT90), Density (RHOZ), Neutron (TNPH or NPHI), Compressional Slowness (DT), Fast Shear (DTSM_FAST); and from petrophysical evaluation: quartz, dolomite, clay (VCL), calcite, evaporite, anhydrite, Matrix Grain Density (RHGE) and total organic carbon (TOC).

With respect to FIG. 7.1, a correlation matrix is shown for the four mineral logs, with the nominal values shown in FIG. 7.2. As with the RQ index example, the correlation matrix is explained by the first three components as shown in FIG. 7.3. Weak positive correlations among all the four logs can be observed except for a stronger positive correlation (=0.76) between WQFM and WSM.

With respect to FIG. 8.1, the loading vectors by PCA analysis on the four log measurements are displayed in PC space in 2D, while the loading vectors are shown in 3D in FIG. 8.2. All logs are considered to contribute to CQ negatively except for WQFM, because more quartz-feldspar-mica concentration in a rock tends to increase its brittleness and improving the likelihood of successful completion. The loading vector display in FIGS. 8.1 and 8.2 demonstrate that WQFM and WSM are slightly separated from the other two logs, which implies that heavier weighting factors may be assigned to these two logs in CQ computation.

Figure 9:
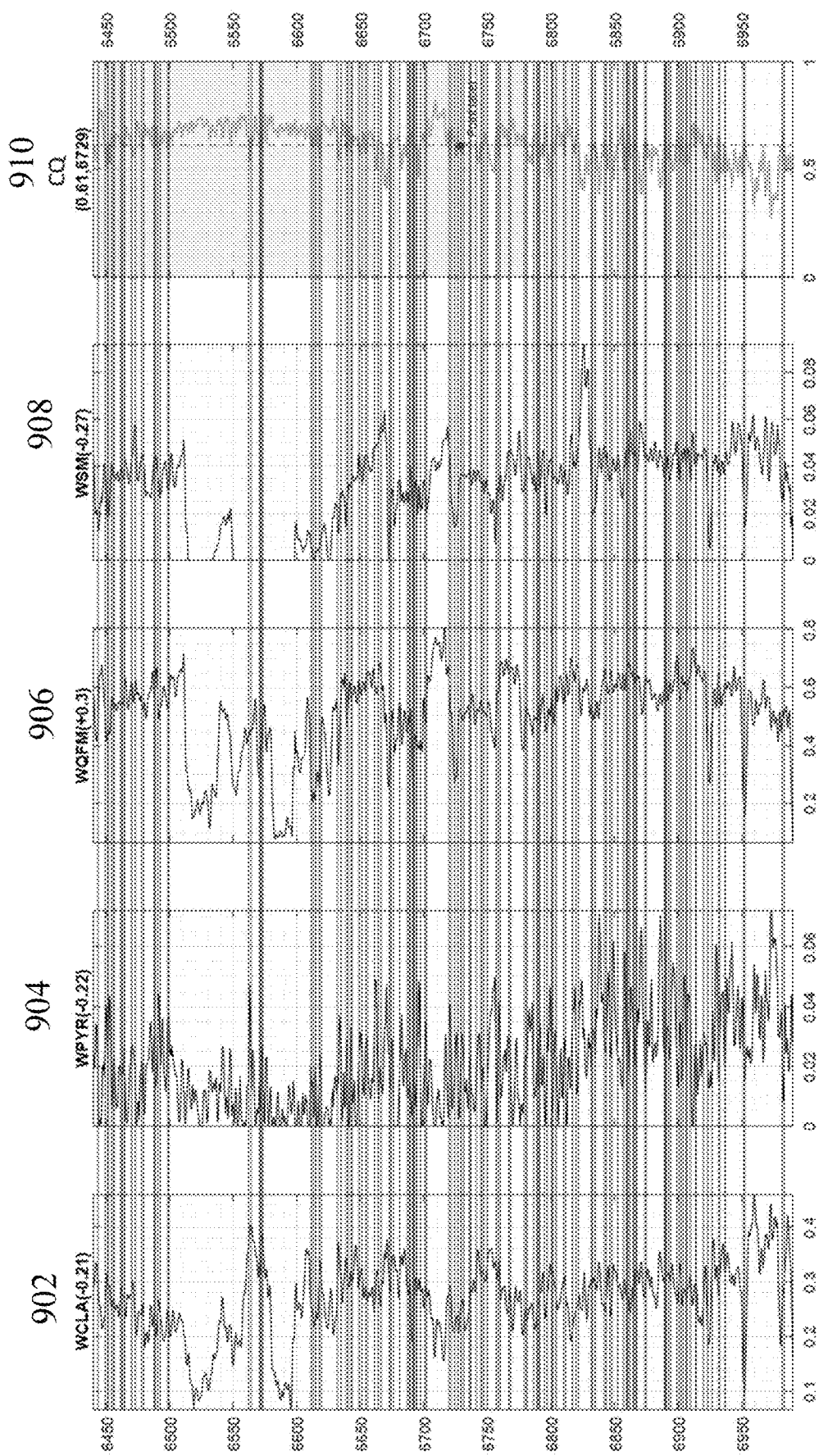
FIG. 9 is a graphical representation showing a continuous CQ index generated by linearly combining four example well log measurements in accordance with embodiments of the present disclosure.

With respect to FIG. 9, all four mineral logs clay (WLCA) 902, pyrite (WPYR) 904, quartz-feldspar-mica (WQFM) 906, total organic carbon (WSM) 908, and the resulting CQ index 910 are displayed. The weighting factors for the logs are −0.21 (WCLA), −0.22 (WPYR), 0.3 (WQFM) and −0.27 (WSM). All logs contribute negatively to the completion quality of the reservoir, with the exception of a positive weighting to WQFM, which indicates that a higher value increases likelihood of completion as result of more brittle rock in the reservoir. Per the computed weighting factors, the influence of each individual mineral on the CQ can be ranked as WQFM>WSM>WPYR>WCLA.

Note that the computed CQ 910 in FIG. 9 has more variation than the RQ index 610 in FIG. 6, and the CQ intervals seem to be independent of RQ. The upper (lower MD) layer contains poorer RQ and better CQ, while the lower layer (higher MD) contains better RQ and poor CQ. This suggests that the selection of sweet spots (good RQ+good CQ) may require a trade-off between the two computed quality indices.

In one or more embodiments, composite quality indices may be generated from multiple quality indices. For example, a composite quality index (QI) curve can be defined as a product of the RQ and CQ, QI=RQ*CQ, or weighted using the weights assigned by interpreters. The resulting continuous QI index could then be modified by the thresholding process discussed above, leading to the identification of "sweet spot" intervals to guide the engineering completion. Using RQ, CQ or QI computed for single wells, interpolating it in 3D using any spatial interpolators such as Geostatistics tools can generate spatial 3D models of RQ, CQ or QI for more accurate reservoir delineation and characterization.

If the pay flag is provided in one well, the optimal thresholding value of continuous RQ/CQ index can be determined by supervised classification methods. Later, the same threshold value can be applied to cutoff RQ/CQ indices curves for other wells to get pay/completable flags if their log characteristics are similar and the corresponding weighting factors are comparable.

RQ, CQ or a composite QI can be further used to perform interpolation or mapping of RQ, CQ, or QI in 3D. The computed RQ, CQ or QI at wells can be considered as known data and interpolation tools, such as geostatistical methods, can be used to build 3D models to either estimate or simulate the RQ, CQ or QI values between wells. The resulting RQ, CQ, QI predictions in 3-dimensional space can help operators to select locations for optimal exploration or production target areas or for infill drilling.

Applications

While the methods in accordance with the present disclosure may be adapted to data analysis in the wellbore context, it is also envisioned that the method may be applied more broadly as a data analytics tool used to combine data from different sources to generate single continuous indices for interpretation and decision-making.

In one or more embodiments, methods in accordance with the present disclosure may be automated or partially automated. In some embodiments, a user-guided iterative interpretation process can be conducted by thresholding the continuous quality index to generate quality flags to assist optimal reservoir development, or guide the decision-making process. In one or more embodiments, methods may be applied to any deviated or horizontal wells provided a set of log measurements are available and registered to their position in a well or in space, either for real-time analysis of drilling measurements, geosteering, or post-drill mode measurement analysis.

Computing System

Figure 10:
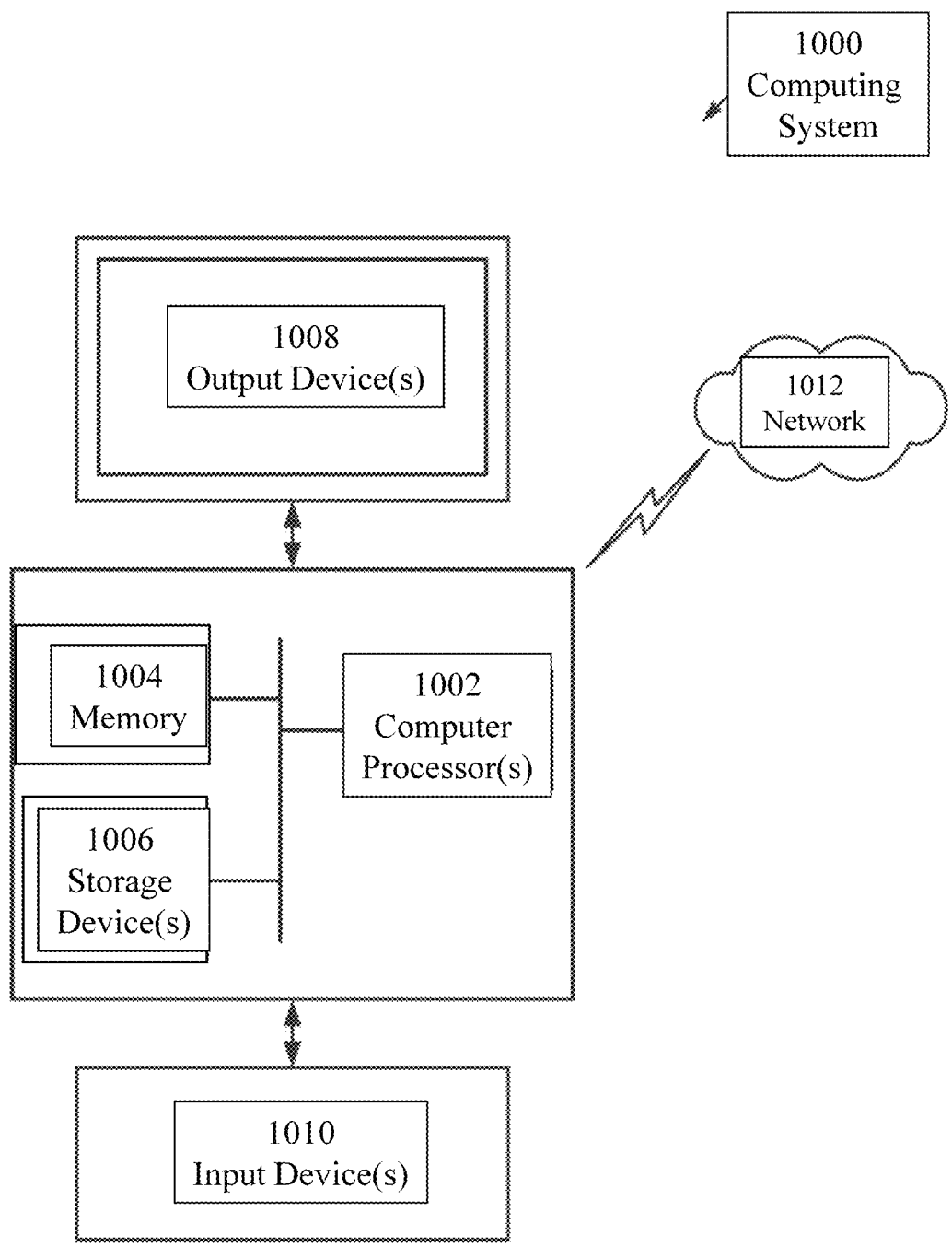
FIG. 10 is a schematic showing an example of a computer system for executing methods in accordance with the present disclosure.

Embodiments of the present disclosure may be implemented on a computing system. Any combination of mobile, desktop, server, embedded, or other types of hardware may be used. For example, as shown in FIG. 10, the computing system (1000) may include one or more computer processor(s) (1002), associated memory (1004) (e.g., random access memory (RAM), cache memory, flash memory, etc.), one or more storage device(s) (1006) (e.g., a hard disk, an optical drive such as a compact disk (CD) drive or digital versatile disk (DVD) drive, a flash memory stick, etc.), and numerous other elements and functionalities. The computer processor(s) (1002) may be an integrated circuit for processing instructions. For example, the computer processor(s) may be one or more cores, or micro-cores of a processor configured to perform methods described above, including normalizing two or more wellbore logs obtained from the output of two or more wellbore tool surveys of a wellbore in a formation of interest; inputting two or more wellbore logs into a correlation matrix; assigning each of the two or more wellbore logs a positive or negative value based on the impact on a selected wellbore quality; performing a principal component analysis of the two or more wellbore logs to obtain one or more loading vectors; computing weighting factors for each of the two or more wellbore logs from the one or more loading vectors; and generating a quality index by linearly combining the two or more wellbore logs using the computed weighting factors.

The computing system (1000) may also include one or more input device(s) (1010), such as a touchscreen, keyboard, mouse, microphone, touchpad, electronic pen, or any other type of input device. Further, the computing system (1000) may include one or more output device(s) (1008), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (1000) may be connected to a network (1012) (e.g., a local area network (LAN), a wide area network (WAN) such as the Internet, mobile network, or any other type of network) via a network interface connection (not shown). The input and output device(s) may be locally or remotely (e.g., via the network (1012)) connected to the computer processor(s) (1002), memory (1004), and storage device(s) (1006). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the disclosure. Further, one or more elements of the aforementioned computing system (1000) may be located at a remote location and connected to the other elements over a network (1012).

Further, embodiments of the disclosure may be implemented on a distributed system having a plurality of nodes, where each portion of the disclosure may be located on a different node within the distributed system. In one embodiment of the disclosure, the node corresponds to a distinct computing device. Alternatively, the node may correspond to a computer processor with associated physical memory. The node may alternatively correspond to a computer processor or micro-core of a computer processor with shared memory and/or resources.

Although only a few examples have been described in detail above, those skilled in the art will readily appreciate that many modifications are possible in the examples without materially departing from this subject disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (f) for any limitations of any of the claims herein, except for those in which the claim expressly uses the words 'means for' together with an associated function.

What is claimed:

1. A method, comprising:
    normalizing two or more wellbore logs obtained from the output of two or more wellbore tool surveys of a wellbore in a formation of interest to provide two or more normalized wellbore logs;
    inputting the two or more normalized wellbore logs into a correlation matrix;
    assigning each of the two or more normalized wellbore logs a positive or negative value based on the impact on a selected wellbore quality;
    performing a principal component analysis of the two or more normalized wellbore logs to obtain one or more loading vectors;
    computing weighting factors for each of the two or more normalized wellbore logs from the one or more loading vectors;
    generating a quality index by linearly combining the two or more normalized wellbore logs using the computed weighting factors;
    inputting a user-defined threshold for the selected quality being indexed, wherein the quality index is a reservoir quality log;
    designating one or more wellbore intervals in a reservoir quality log as pay regions based on the user-defined threshold; and
    transitioning the wellbore to production and producing hydrocarbons from the one or more wellbore intervals designated as pay regions.

2. The method of claim 1, wherein the two or more wellbore logs comprise at least gamma ray, deep resistivity, bulk rock density, and thermal neutron porosity.

3. The method of claim 1, wherein the quality index further comprises a completion quality log, and wherein the method further comprises:

designating one or more regions in the completion quality log as completion targets.

4. The method of claim 3, further comprising:
completing one or more regions designated as completion targets.

5. The method of claim 3, wherein the two or more wellbore logs comprise at least clay, pyrite, quartz-feldspar-mica, and total organic carbon.

6. The method of claim 1, wherein computing weighting factors for each of the two or more normalized wellbore logs comprises analyzing each of the normalized wellbore logs with a Kriging estimator that analyzes the loading vectors of the normalized wellbore logs from the principal component analysis.

7. The method of claim 1, further comprising:
performing interpolation or mapping of the quality index in 3D.

8. The method of claim 1, wherein the user-defined threshold is optimized to minimize the misclassification rate of one or more wellbore intervals in the quality log.

9. The method of claim 8, wherein the optimized threshold is applied to quality logs obtained from other wells.

10. The method of claim 1, wherein the principal component analysis comprises kernel principal component analysis.

11. The method of claim 1, wherein performing the principal component analysis comprises plotting principal component analysis results in 2D or 3D, and wherein the plotted data is used to generate the loading vectors.

12. The method of claim 1, wherein the two or more wellbore logs comprises at least four wellbore logs selected from a group consisting of: gamma ray, deep resistivity, bulk density, thermal neutron porosity, carbon weight fraction, clay weight fraction, pyrite weight fraction, quartz-feldspar-mica weight fraction, total organic carbon weight fraction, neutron, spectroscopy mineralogy, anhydrite, calcite, dolomite, evaporite, matrix grain density, NMR porosity, and permeability.

13. The method of claim 3, wherein the two or more wellbore logs comprises at least four wellbore logs selected from a group consisting of: clay, pyrite, quartz-feldspar-mica, total organic carbon, gamma ray, resistivity, density, neutron, compressional slowness, fast shear, quartz, dolomite, clay, calcite, evaporite, anhydrite, and matrix grain density.

14. A method, comprising:
normalizing two or more wellbore logs obtained from the output of two or more wellbore tool surveys of a wellbore in a formation of interest to provide two or more normalized wellbore logs;
inputting the two or more normalized wellbore logs into a correlation matrix;
assigning each of the two or more normalized wellbore logs a positive or negative sign based on the impact on a selected wellbore quality;
performing a principal component analysis of the two or more normalized wellbore logs to obtain one or more loading vectors;
computing weighting factors for each of the two or more normalized wellbore logs from the one or more loading vectors;
generating a reservoir quality log by linearly combining the two or more normalized wellbore logs using the computed weighting factors;
generating a completion quality log by linearly combining the two or more normalized wellbore logs using the computed weighting factors;
preparing a composite reservoir quality index from the product of the reservoir quality log and the completion quality log;
inputting a user-defined threshold for the composite reservoir quality log;
designating one or more wellbore intervals in a composite reservoir quality log as regions of interest based on the user-defined threshold; and
transitioning the wellbore to production or completion and producing hydrocarbons from or completing the one or more wellbore intervals designated as regions of interest.

15. The method of claim 14, wherein the two or more wellbore logs are selected from a group consisting of: gamma ray, deep resistivity, bulk rock density, thermal neutron porosity, clay, pyrite, quartz-feldspar-mica, and total organic carbon.

16. The method of claim 14, wherein computing weighting factors for each of the two or more normalized wellbore logs comprises analyzing each of the normalized wellbore logs with a Kriging estimator that analyzes the loading vectors of the normalized wellbore logs from the principal component analysis.

17. The method of claim 14, further comprising performing interpolation or mapping of the composite reservoir quality index in 3D.

18. The method of claim 14, wherein the user-defined threshold is optimized to minimize the misclassification rate of one or more wellbore intervals in the composite reservoir quality log.

19. The method of claim 14, wherein the principal component analysis comprises kernel principal component analysis.

20. The method of claim 14, wherein performing the principal component analysis comprises plotting principal component analysis results in 2D or 3D, and wherein the plotted data is used to generate the loading vectors.

* * * * *